United States Patent
Saltykov et al.

(10) Patent No.: US 8,068,631 B2
(45) Date of Patent: Nov. 29, 2011

(54) CONSTRUCTION OF A COMPLETELY-IN-CANAL HEARING INSTRUMENT WITH RECEIVER COMPARTMENT

(75) Inventors: Oleg Saltykov, Fair Lawn, NJ (US); Fred McBagonluri, East Windsor, NJ (US)

(73) Assignee: Siemens Hearing Instruments Inc., Piscataway, NJ (US)

( * ) Notice: Subject to any disclaimer, the term of this patent is extended or adjusted under 35 U.S.C. 154(b) by 1273 days.

(21) Appl. No.: 11/696,352

(22) Filed: Apr. 4, 2007

(65) Prior Publication Data
US 2008/0247581 A1 Oct. 9, 2008

(51) Int. Cl.
*H04R 25/00* (2006.01)
(52) U.S. Cl. .......... 381/328; 381/324; 181/130
(58) Field of Classification Search ........ 381/328, 381/322, 324
See application file for complete search history.

(56) References Cited

U.S. PATENT DOCUMENTS

| | | | |
|---|---|---|---|
| 4,800,982 A | 1/1989 | Carlson | |
| 4,854,415 A * | 8/1989 | Goschke | 181/130 |
| 4,870,688 A * | 9/1989 | Voroba et al. | 381/60 |
| 4,937,876 A * | 6/1990 | Biermans | 381/324 |
| 5,887,070 A * | 3/1999 | Iseberg et al. | 381/380 |
| 6,212,283 B1 * | 4/2001 | Fletcher et al. | 381/313 |
| 6,228,020 B1 * | 5/2001 | Juneau et al. | 600/25 |
| 6,359,993 B2 * | 3/2002 | Brimhall | 381/328 |
| 7,706,557 B2 * | 4/2010 | Saltykov | 381/324 |
| 2005/0074138 A1 | 4/2005 | Saltykov | |
| 2008/0181440 A1 * | 7/2008 | Saltykov | 381/328 |
| 2008/0273729 A1 * | 11/2008 | Saltykov et al. | 381/324 |
| 2009/0060241 A1 * | 3/2009 | Saltykov et al. | 381/324 |
| 2009/0060242 A1 * | 3/2009 | Saltykov et al. | 381/328 |
| 2009/0285427 A1 * | 11/2009 | Saltykov | 381/328 |

FOREIGN PATENT DOCUMENTS

| | | |
|---|---|---|
| DE | 12 70 616 B | 6/1968 |
| DE | 10 2005 009377 B3 | 9/2006 |
| EP | 1 209 948 A2 | 5/2002 |
| EP | 1 341 397 A2 | 9/2003 |
| FR | 2 596 644 A1 | 10/1987 |
| WO | 01/69974 A2 | 9/2001 |
| WO | 2006/108099 A2 | 10/2006 |

OTHER PUBLICATIONS

European Search Report of Application No. 08 25 1279 dated Dec. 15, 2010.

* cited by examiner

*Primary Examiner* — Davetta W Goins
*Assistant Examiner* — Phylesha Dabney
(74) *Attorney, Agent, or Firm* — Francis G Montgomery

(57) ABSTRACT

A construction of a CIC instrument is provided, along with a corresponding method of manufacturing such a CIC instrument, that prevents floating components from contacting with an isolated receiver and, therefore, assures feedback-free operation. This is achieved through the presence of a compartment for the receiver in which the receiver resides, and a cover placed on top of the receiver compartment in a mating recess of the receiver compartment.

7 Claims, 2 Drawing Sheets

CONSTRUCTION OF A COMPLETELY-IN-CANAL HEARING INSTRUMENT WITH RECEIVER COMPARTMENT

BACKGROUND

The present invention is directed to a completely-in-canal (CIC) hearing aid design which has a receiver compartment in which the receiver is placed to keep the receiver isolated from the other components in order to help reduce or eliminate feedback.

One of the basic types of hearing aid designs is called the completely-in-canal (CIC) design and is characterized in its small size compared to other designs. A typical construction of a CIC hearing instrument includes components that are not firmly fixed, but rather are attached to fixed components by miniature electrical wires—these are called "floating components". The use of such floating components provides more flexibility over fixed components during assembly of custom CIC instruments because such components can be positioned to accommodate various shapes of custom CIC instruments.

One of the components of the hearing aid is the receiver that converts an electrical signal to sound. The receiver motor produces mechanical vibrations. It is important that a hearing aid receiver be mechanically isolated from other CIC components because of the vibrations it creates during its operation. Without isolation, a vibrating receiver will affect a normal operation of a CIC instrument by causing feedback.

One of the possible ways of isolating the receiver vibrations from the rest of the CIC components is described in U.S. Patent Publication No. 200510074138, herein incorporated by reference. FIG. 23, e.g., of this reference illustrates an isolating construction with the receiver being attached to the shell by two studs made of a soft rubber-like material. Such a construction provides for a necessary mechanical isolation of the receiver and allows for a feedback-free operation of a hearing aid.

It is quite possible that during a CIC assembly, a floating hybrid (or another floating component) will come into a contact with an mechanically-isolated receiver, therefore causing feedback. Furthermore, in a conventional CIC receiver, the electrical terminals are positioned on a back wall, opposite to the receiver tube.

SUMMARY

An inventive construction of a CIC instrument according to a preferred embodiment includes a receiver compartment built from the same material as the shell, which contains and physically separates the receiver from the floating components. In order to further physically isolate the suspended receiver, a rigid cover is placed into a matching recess of the receiver compartment.

Accordingly, a CIC hearing device is provided comprising: a shell comprising a receiver compartment and floating components, all of which are outside of the receiver compartment; a receiver mounted in the receiver compartment; and a rigid cover that covers a top of the receiver compartment, preventing contact between the receiver and the floating components.

Additionally, a method for manufacturing a completely-in-ear (CIC) hearing device, is also included comprising: providing a shell comprising a receiver compartment; mounting all floating components, outside of the receiver compartment; mounting a receiver in the receiver compartment; and adding a rigid cover that covers a top of the receiver compartment, thereby preventing contact between the receiver and the floating components.

DESCRIPTION OF THE DRAWINGS

The invention is described below with reference to various preferred embodiments, as illustrated in the Figure and described in detail below.

DETAILED DESCRIPTION OF THE PREFERRED EMBODIMENTS

Figure 1:
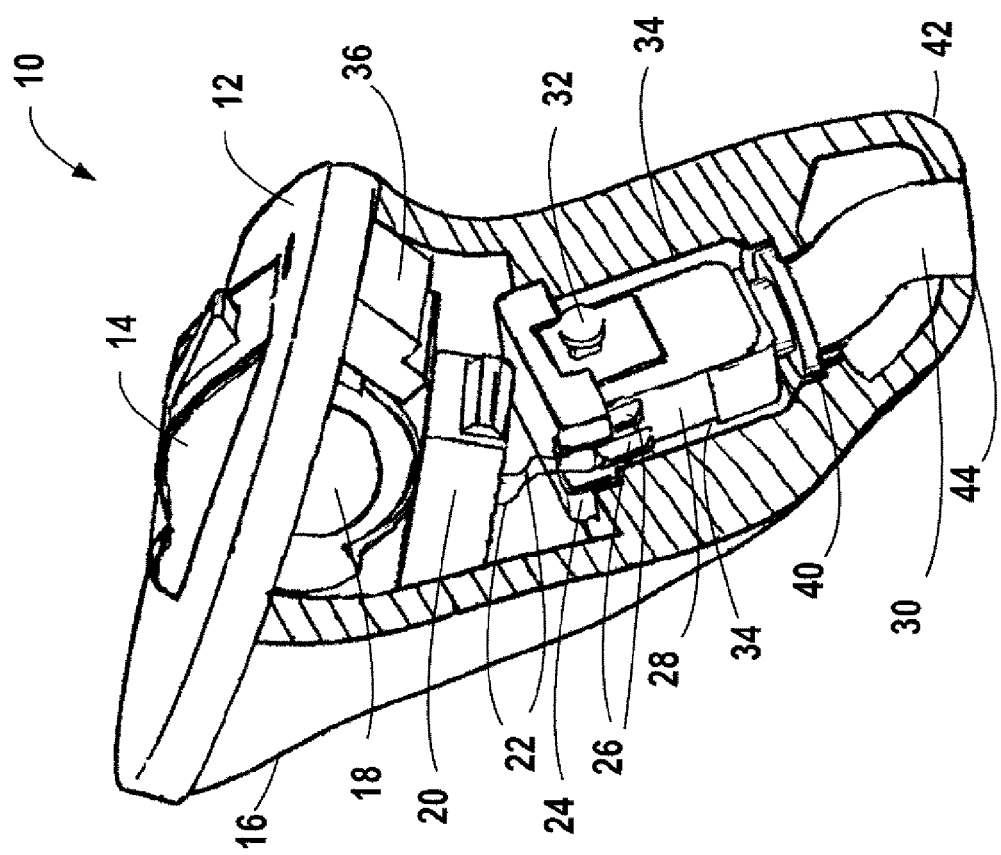
FIG. 1 is a pictorial illustration of a receiver mounting according to an embodiment of the invention.

FIG. 1 illustrates a preferred embodiment of the inventive CIC hearing aid 10. A shell 16 and faceplate 12 bound the internal workings of the hearing aid. These include the battery 18 in a battery compartment having a battery door 14 that protrudes slightly from the faceplate 12. The hearing aid also comprises a microphone 36 and hybrid 20.

The focus of this application is the relationship of the receiver 28 to the hearing aid 10. FIG. 1 shows the receiver 28 being attached to a tube 30 that conveys the sound waves from the hearing aid 10. The tube 30 protrudes through a passage 44 in a tip 42 of the shell 16. A flange 40 is provided to help provide support within the shell 16.

The receiver comprises a pair of studs 32 (only one visible in FIG. 1) that are used to mount the receiver 28 to the shell body 16. The receiver 28 is connected to other hearing aid circuitry, such as the hybrid 20, via wires 22 that are attached to terminals 26 of the receiver 28. Advantageously, the shell 16 comprises a receiver compartment 34 that is built from the same material as the shell 16, both of which can be manufactured by the same stereo-lithography process.

Figure 2A:
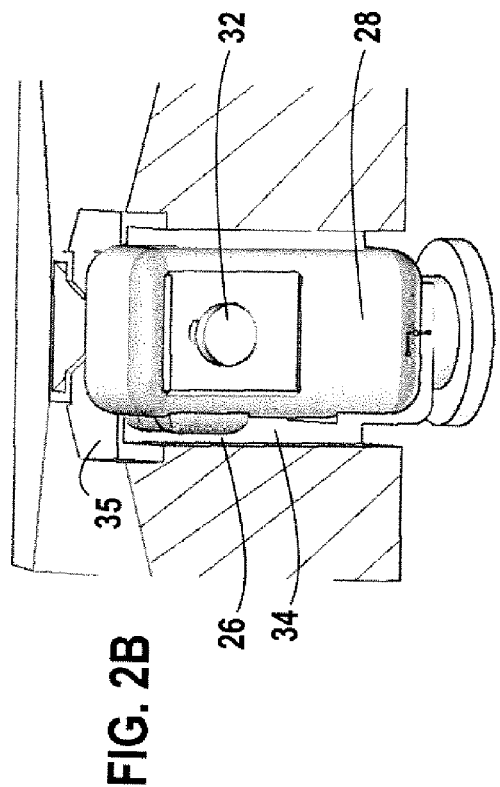
FIGS. 2A-C are pictorial illustrations of the receiver mounting without the cover.
Figure 2B:
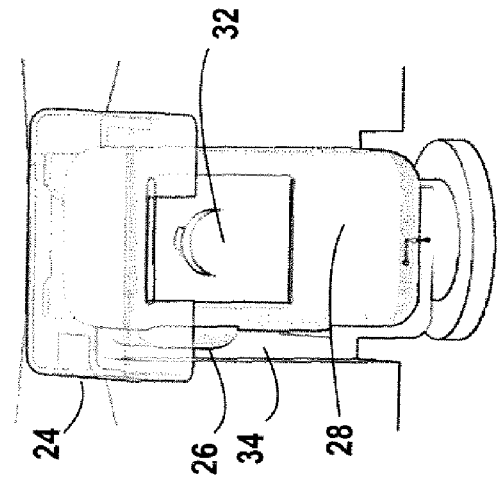
Figure 2C:
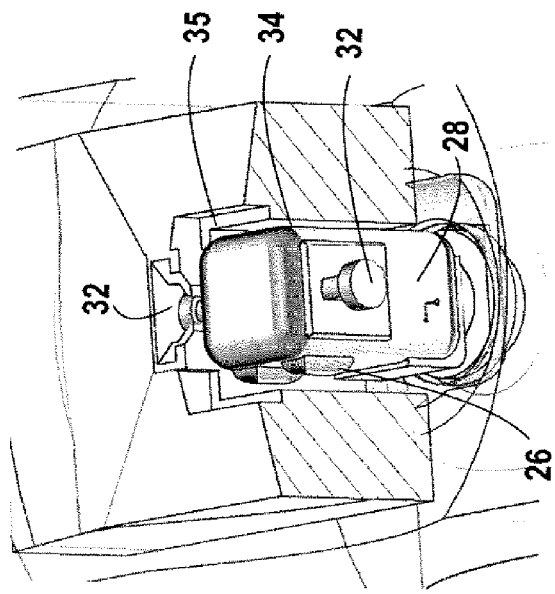

The receiver compartment 34, in a preferred embodiment, is designed to tightly surround the receiver 28 without contacting it, outside of the flexible tube 30 and the studs 32. FIGS. 2A-C illustrate various views of this mounting, without the cover 24.

Figure 3A:
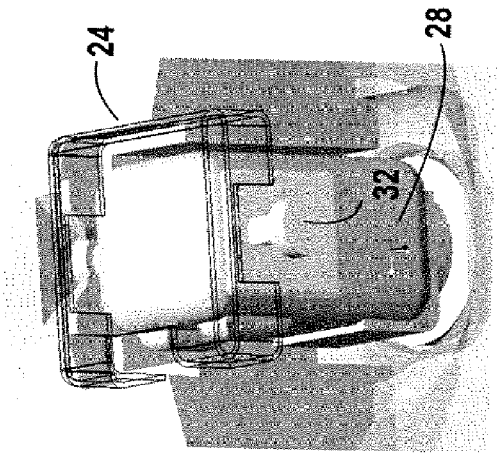
FIGS. 3A-B are pictorial illustrations of the receiver mounting with the cover.
Figure 3B:
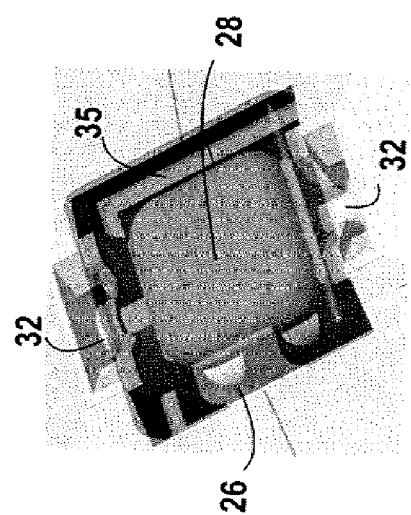

Referring to FIGS. 1 and 3A-B, in order to further physically isolate the suspended receiver 28, a rigid cover 24 is placed into a matching recess 35 of the receiver compartment 34. The top of the rigid cover 24 can be of any workable height provided it protects the receiver from contact with the floating components. The receiver 28 does not touch the cover 24—again, for the purposes of reducing feedback by having the receiver suspended within the compartment 34. The cover 24 matingly and securely fits in the cover recess 35, and it may or may not be affixed (either wholly or partially, permanently or removably) to the shell 16 within the recess 35.

Contrary to the conventional CIC receiver in which the electrical terminals 26 are positioned on a back wall, opposite to the receiver tube, the electrical terminals in this embodiment of the receiver 28 are positioned on a side wall (generally parallel to the receiver diaphragm), which allows reducing the height of the receiver assembly 28. In such a construction, the overall length of the receiver 28 and the rigid cover 24 does not exceed the length of a receiver with a conventional position of the terminals, so that short CIC instruments can be assembled.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware components configured to perform the specified functions. The particular implementations shown and described herein are illustrative examples of the invention and are not intended to otherwise limit the scope of the invention in any way. For the sake of brevity, conventional electronics and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". The word mechanism is intended to be used generally and is not limited solely to mechanical embodiments. Numerous modifications and adaptations will be readily apparent to those skilled in this art without departing from the spirit and scope of the present invention.

10 hearing aid
12 face plate
14 battery door
16 shell
18 battery
20 hybrid
22 wires
24 cover
26 terminals
28 receiver
30 tube
32 stud
34 receiver compartment
35 cover recess
36 microphone
40 flange
42 tip
44 passage

What is claimed is:

1. A completely-in-ear (CIC) hearing device, comprising:
   a shell adapted to contain floating and non-floating components of the hearing device;
   a receiver compartment formed as part of the shell within the shell interior space, said floating components all being contained in the shell outside of the receiver compartment at a first end;
   a receiver, situated in the receiver compartment, having a first end wall situated within the first end of the receiver compartment, a second end wall affixed to a receiver tube, a first side wall with electrical terminals for attaching the receiver to other hearing device circuitry, and two opposite side walls with studs located thereon which mount the receiver to the shell; and
   a rigid cover that covers the first end of the receiver compartment without contacting the receiver situated therein, preventing contact between the receiver and the floating components.

2. The CIC hearing device according to claim 1, wherein the first side wall is generally perpendicular to a primary plane defined by the cover.

3. The CIC hearing device according to claim 1, wherein the cover fits at least partially within a recess of the compartment.

4. The CIC hearing device according to claim 1, wherein the receiver is suspended within the compartment solely by the receiver tube affixed to the second end wall of the receiver and the studs, which mount the receiver to the shell.

5. The CIC hearing device according to claim 1, wherein the inside perimeter of the receiver compartment generally corresponds in shape with the outside perimeter of the receiver and the receiver is generally situated in near-touching proximity to the inside perimeter of the compartment.

6. A method for manufacturing a completely-in-ear (CIC) hearing device, comprising:
   providing a shell comprising a receiver compartment formed as part of the shell within the shell interior space, said shell adapted to contain floating and non-floating components of the hearing device;
   situating all floating components, outside of the receiver compartment at a first end;
   situating a receiver in the receiver compartment, said receiver having a first end wall situated within the first end of the receiver compartment, a second end wall affixed to a receiver tube, a first side wall with electrical terminals for attaching the receiver to other hearing device circuitry, and two opposite side walls with studs located thereon which mount the receiver to the shell; and
   providing a rigid cover that covers the first end of the receiver compartment without contacting the receiver situated therein, thereby preventing contact between the receiver and the floating components.

7. The method according to claim 6, wherein situating the receiver comprises suspending the receiver within the compartment solely by the receiver tube affixed to the second end wall of the receiver, and the studs that mount the receiver to the shell.

* * * * *